United States Patent [19]

Burrows

[11] Patent Number: 4,776,952

[45] Date of Patent: Oct. 11, 1988

[54] REGULATED CONTROL VALVE ASSEMBLY FOR A WATER PURIFICATION SYSTEM

[76] Inventor: Bruce D. Burrows, 24844 Anza Dr., Valencia, Calif. 91355

[21] Appl. No.: 126,627

[22] Filed: Nov. 30, 1987

Related U.S. Application Data

[63] Continuation-in-part of Ser. No. 848,351, Apr. 4, 1986, Pat. No. 4,743,366, which is a continuation of Ser. No. 545,880, Jul. 23, 1984, Pat. No. 4,595,497.

[51] Int. Cl.$^4$ .................................................. B01D 13/00
[52] U.S. Cl. ............................... 210/110; 210/195.2; 210/257.2; 210/321.6; 210/321.72
[58] Field of Search ....................... 210/110, 195.2, 129, 210/207.2, 321.6, 321.72, 420, 116

[56] References Cited

U.S. PATENT DOCUMENTS

| | | |
|---|---|---|
| 2,954,799 | 10/1960 | Kryzer . |
| 3,089,513 | 5/1963 | Kirk . |
| 3,493,496 | 2/1970 | Bray . |
| 3,542,199 | 11/1970 | Bray . |
| 3,568,843 | 3/1971 | Brown . |
| 3,719,593 | | Astil . |
| 3,726,793 | 8/1986 | Bray . |
| 3,794,173 | 2/1974 | Bray . |
| 3,831,757 | 8/1974 | Gossett . |
| 3,887,463 | 6/1975 | Bray . |
| 3,963,612 | 6/1976 | Gossett . |
| 3,967,638 | 7/1976 | Tondreau . |
| 4,021,343 | 5/1977 | Tyler . |
| 4,086,166 | 4/1978 | Martin . |
| 4,176,063 | 11/1979 | Tyler . |
| 4,210,533 | 7/1980 | Astl . |
| 4,288,326 | 9/1981 | Keefer . |
| 4,347,132 | 8/1982 | Davis . |
| 4,391,712 | 7/1983 | Tyler et al. . |
| 4,585,554 | 4/1986 | Burrows . |
| 4,595,497 | 6/1986 | Burrows . |
| 4,604,194 | 8/1986 | Entingh . |
| 4,657,674 | 4/1987 | Burrows . |
| 4,695,375 | 9/1987 | Tyler .............................. 210/257.2 |
| 4,743,366 | 5/1988 | Burrows .............................. 210/110 |

Primary Examiner—Peter Kratz
Attorney, Agent, or Firm—Kelly, Bauersfeld & Lowry

[57] ABSTRACT

A regulated control valve assembly is provided for use in a water purification system having a reverse osmosis unit to produce relatively purified water from a feed water supply of ordinary tap water or the like. Purified water produced by the reverse osmosis unit is supplied to a purified water chamber in a storage vessel ready for dispensing on demand by operation of a faucet valve. The control valve assembly includes a throttle valve responsive to the purified water chamber reaching a substantially filled condition to throttle or halt feed water inflow to the system. In addition, the control valve incorporates a pressure regulator for shifting the throttle valve in a manner regulating the pressure of feed water supplied to the purification system to a predetermined, relatively low pressure level.

16 Claims, 2 Drawing Sheets

[4,776,952]

REGULATED CONTROL VALVE ASSEMBLY FOR A WATER PURIFICATION SYSTEM

BACKGROUND OF THE INVENTION

This is a continuation-in-part of copending application Ser. No. 848,351, filed Apr. 4, 1986, now U.S. Pat. No. 4,743,366 issued May 10, 1988 which is a continuation of copending Ser. No. 545,880, filed July 23, 1984, now U.S. Pat. No. 4,595,497, issued June 17, 1986.

This invention relates generally to improvements in water purification systems of the type having a reverse osmosis unit for producing relatively purified water from an incoming supply of ordinary tap or feed water or the like. More particularly, this invention relates to an improved regulated control valve assembly for use in a water purification system to limit the pressure of feed water supplied to the system, and thereby permit relatively lightweight and economical system components.

Water purification systems in general are relatively well-known in the art for producing a supply of purified water from ordinary tap water or the like. Water purification systems commonly include a reverse osmosis unit connected to an incoming tap or feed water supply, wherein the reverse osmosis unit produces two separate water outflows including a purified water supply, and a waste or reject water supply, sometimes referred to as brine, with impurities concentrated therein. In purification systems of this type, the production of purified water is normally relatively slow whereby the purified water outflow is typically coupled to and stored within an appropriate storage vessel ready for dispensing when desired through a manually operated faucet valve or the like. Such purification systems are normally intended for installation into the compact cabinet space beneath a standard residential kitchen sink, with the faucet valve being mounted on or at the sink in an accessible position for use. Examples of water purification systems of this general type are illustrated by reference to U.S. Pat. Nos. 4,585,554, and 4,595,497.

In such water purification systems, the storage vessel for the purified water commonly includes a purified water chamber and a reject water chamber separated from each other by a movable barrier, such as a resilient diaphragm or bladder or the like. While the faucet valve is closed, the produced purified water expands and fills the purified water chamber to expel reject water from the reject water chamber for flow to a suitable drain. However, when dispensing of purified water is desired, for example, for cooking, drinking, etc., the faucet valve is opened to create an open discharge path communicating the purified water chamber to an open discharge spout or the like. At the same time, other valve components in the system function to direct a substantial flow of reject water into the reject water chamber thereby providing a fluid driving medium capable of forcing the purified water through the open discharge path to the discharge spout.

In the past, the substantial reject water flow through the reject water chamber for purified water delivery purposes has resulted in at least temporary pressurization of the reject water chamber to a level substantially equalling feed water line pressure. In domestic or residential water supply systems wherein the feed water line pressure can range typically from about 40 to 150 psi, the storage vessel may thus be subjected to a relatively high fluid pressure during normal operation of the water supply system. Such pressurization of the storage vessel has in the past required a relatively rugged storage vessel construction of metal or reinforced plastic or fiberglas materials, whereby the storage vessel has constituted a major cost component in the water supply system. Moreover, the presence of relatively high fluid pressures within the storage vessel enhances the risk of occasional failure of other system components such as valves, seals, etc., resulting in potential water leakage and accompanying risk of water damage.

In U.S. Pat. No. 4,595,497, and related Ser. No. 848,351, a control valve assembly is described for effectively limiting the fluid pressure level within the storage vessel of a purified water supply system. This control valve assembly includes pressure limit means responsive to storage vessel pressure level to throttle or halt feed water inflow to the system when the storage vessel pressure level reaches or exceeds a predetermined threshold pressure. In addition, the control valve assembly throttles or halts feed water inflow to the system when the purified water chamber within the storage vessel reaches a substantially filled condition. In a preferred form, this control valve assembly limits storage vessel pressure to a predetermined threshold substantially below feed water line pressure, thereby permitting the storage vessel to be constructed from relatively lightweight, cost-efficient structures.

While the control valve assembly described in U.S. Pat. No. 4,595,497 and related Ser. No. 848,351 beneficially protects the storage vessel against exposure to relatively high fluid pressures, such control valve assembly does not protect the reverse osmosis unit and other system components against exposure to relatively high fluid pressures. That is, feed water at domestic line pressure is supplied during normal system operation to the reverse osmosis unit. In many geograhical locations, variations in terrain elevation and the like require the feed water to be delivered at substantial pressure typically in the range of 80 to 100 psi and sometimes as high as 150 to 200 psi. Upstream pressure regulators are commonly employed to reduce the feed water pressured, but such pressure regulators occasionally fail resulting in high water pressures supplied to the reverse osmosis unit and other components of the purified water system. Exposure of the reverse osmosis unit to such high fluid pressures can result in premature unit failure and/or compaction or collapse of the reverse osmosis membrane. Additional pressure regulators have sometimes been installed upstream of the water supply system to provide additional protection against high fluid pressures, but such devices involve undesirable system cost increases and are typically constructed from brass having a brass valve seat which tends to erode and fail over a relatively short period of time due to insufficient flow therethrough.

There exists, therefore, a significant need for an improved purified water supply system designed for reliable delivery of purified water from a storage vessel, but wherein the reverse osmosis unit and storage vessel and other system components are protected against exposure to relatively high fluid pressures. The present invention fulfills these needs and provides further related advantages.

SUMMARY OF THE INVENTION

In accordance with the invention, an improved purified water supply system is provided for use in producing and storing a supply of relatively purified water from an incoming supply of ordinary tap or feed water or the like. The improved water supply system includes a reverse osmosis unit for producing the purified water supply which is stored within a compact storage vessel for immediate use, wherein the system includes a regulated control valve assembly designed to protect the reverse osmosis unit and storage vessel against exposure to water pressures exceeding a predetermined threshold pressure.

In a preferred arrangement, the water supply system includes a reverse osmosis unit having an inlet connected to a supply of ordinary tap water or the like. The reverse osmosis unit operates in a known manner to produce dual water outflows, namely, the purified water supply with impurities substantially removed, and a supply of reject water or brine with impurities concentrated therein. The purified water supply is stored within the storage vessel ready for dispensing, for example, through a discharge path which can be opened by operation of one or more faucet valves, whereas the reject water supply is ultimately discharged to an appropriate drain.

The storage vessel comprises a relatively lightweight and preferably compact tank container defining an internal purified water chamber and a reject water chamber separated from each other by a movable barrier. The produced purified water supply is coupled for flow into the purified water chamber. The faucet valve may be constructed as described in U.S. Pat. No. 4,585,554, which is incorporated by reference herein, and includes means for coupling the reject water flow to the drain or alternately to the reject water chamber, in accordance with the operational state of the system. More particularly, when the faucet valve is open, the faucet valve directs reject water at a substantial flow rate into the reject water chamber to provide a driving medium for expelling produced purified water through the open discharge path. Alternately, when the faucet valve is closed, the produced purified water refills the purified water chamber within the storage vessel, with produced reject water and reject water within the storage vessel being coupled to the drain.

In the preferred form, the regulated control valve assembly is mounted on the storage vessel and includes a throttle valve for halting or throttling feed water inflow to the reverse osmosis unit. When the fluid pressure within the storage vessel reaches a predetermined threshold pressure for any reason, the regulated control valve assembly responds by moving the throttle valve to throttle or halt feed water inflow thereby preventing further system pressure rise. In addition, the regulated control valve assembly includes an enlarged pressure plate positioned for engagement by the movable barrier within the storage vessel when the purified water chamber reaches a substantially filled condition. Upon such engagement, the pressure plate is displaced for correspondingly displacing the throttle valve to a position halting or throttling feed water inflow.

The regulated control valve assembly further incorporates a pressure regulator for limiting the pressure of feed water supplied to the reverse osmosis unit and other components of the purification system. In the preferred form, this pressure regulator comprises a regulating piston coupled to the throttle valve and exposed on opposite sides respectively to the fluid pressure within the storage vessel and the fluid pressure of the feed water supply coupled to the reverse osmosis unit. This regulating piston cooperates with other components of the control valve assembly to prevent the pressure of feed water supplied to the reverse osmosis unit from exceeding a predetermined threshold pressure, thereby preventing exposure of the reverse osmosis unit to excessive pressure levels.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
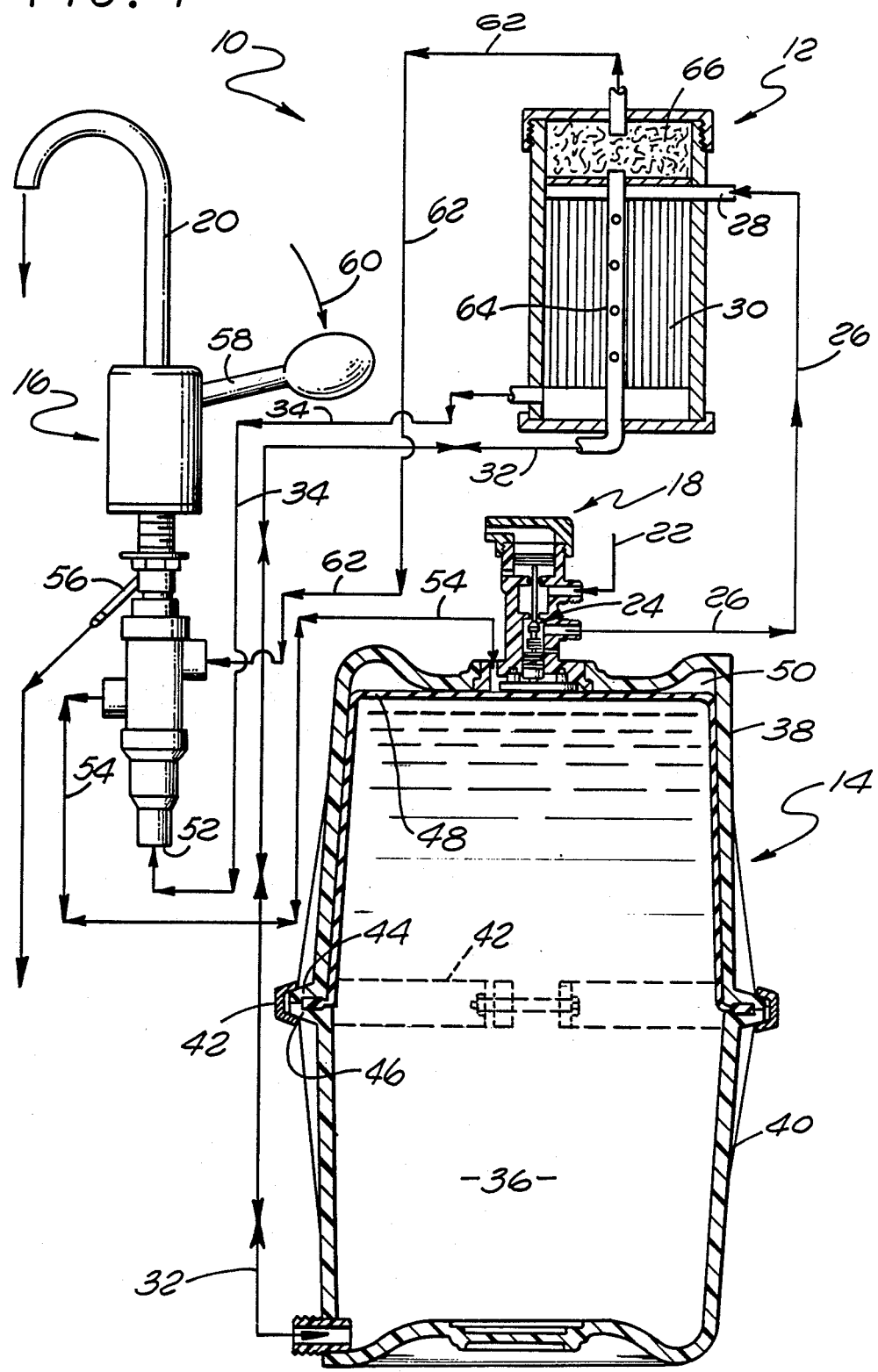
FIG. 1 is a diagrammatic view illustrating an improved purified water system including a regulated control valve assembly embodying the novel features of the invention.

As shown in the exemplary drawings, an improved purified water supply system is referred to generally by the reference numeral 10 in FIG. 1. The water supply system 10 includes a reverse osmosis unit 12 for converting an ordinary tap or feed water supply or the like into a reltively pure supply of water which is stored within a relatively lightweight and compact storage vessel 14. The purified water within the storage vessel is delivered on demand for use by operation of a faucet or dispensing valve assembly 16. A regulated control valve assembly 18 functions in cooperation with the faucet valve assembly 16 to insure reliable delivery of purified water from the storage vessel 14 to a discharge spout 20, while limiting the pressure within the storage vessel to a pressure level substantially less than tap water line pressure. In addition, the control valve assembly 18 incorporates a pressure regulator (FIG. 2) for limiting the pressure of feed water supplied to the reverse osmosis unit 12 and other system components.

The improved water supply system 10 of the present invention is designed particularly for use in residential and other domestic applications to produce a ready supply of relatively pure water from ordinary tap or feed water or the like. The system 10 utilizes the reverses osmosis unit 12 to convert the supply of feed water into dual water outflows including a supply of relatively purified water and a supply of waste or reject water, sometimes referred to as brine, having impurities concentrated therein. The purified water supply is normally coupled to and stored within the storage vessel 14 ready for use on demand for cooking, drinking, etc. The regulated control valve assembly 18 operates in conjunction with opening and closing of the faucet valve assembly 16 to insure reliable purified water delivery, while protecting the reverse osmosis unit 12 and other system components including the storage vessel 14 against exposure to relatively high fluid pressures. Accordingly, the various system components may be constructed with a lightweight and economical design without risk of pressure-caused failures. Moreover, pressure-caused premature failure of the reverse osmosis unit and/or undesirable compaction thereof are prevented.

The general construction and overall operation of the water purification system depicted in FIG. 1 conforms in most respects with the system described in U.S. Pat. No. 4,595,497 and related copending Ser. No. 848,351. More specifically, as shown generally in FIG. 1, a tap feed water supply line 22 of a standard residential water supply system or the like is coupled to the regulated control valve assembly 18 having an inlet throttle valve 24. This throttle valve 24, the operation of which will be described in more detail, is normally open to permit feed water flow through a feed conduit 26 to an inlet 28 on the reverse osmosis unit 12. The reverse osmosis unit 12 includes an internal membrane 30 which functions in manner known to those skilled in the art to separate the incoming feed water supply into the purified water supply and the reject water supply. The produced purified water supply is discharged from the reverse osmosis unit 12 through an outlet conduit 32, whereas the produced reject water supply is discharged through a separate discharge conduit 34.

The purified water supply produced by the reverse osmosis unit 12 is coupled by the outlet conduit 32 for flow into a purified water chamber 36 within the storage vessel 14. This storage vessel 14 comprises a relatively lightweight tank container formed from a pair of cup-shaped containers 38 and 40 mounted one on top of the other in facing relation and securely connected by a circumferential band 42 or the like fastened about outwardly radiating flanges 44 and 46 on the containers. A movable barrier 48 such as a cup-shaped diaphragm or the like has its periphery trapped between the flanges 44 and 46 and functions to divide the internal volume of the vessel into the purified water chamber 36 and an upper reject water chamber 50.

The reject water supply produced by the reverse osmosis unit 12 flows through the reject water discharge conduit 34 to a lower inlet port 52 of the faucet valve assembly 16. As will be described in more detail, the faucet valve assembly 16 directs the reject water supply through appropriate internal flow paths (not shown) and further through a reject branch conduit 54 for flow into the reject water chamber 50 of the storage vessel 14, or, in the alternative, through the faucet valve assembly 16 ultimately for discharge to an appropriate drain through a drain tube 56.

In general operation of the water supply system 10, when the faucet valve assembly 16 is closed to prevent purified water flow to the discharge spout 20, the reverse osmosis unit 12 produces purified water which expands and fills the purified water chamber 36 in the storage vessel 14. During the filling process, reject water produced by the reverse osmosis unit 12 is coupled to the faucet valve assembly 16 for flow through the drain tube 56 to drain. At the same time, any reject water within the reject water chamber 50 is expelled by the expanding purified water chamber 36 for flow of the reject water through the faucet valve assembly 16 to the drain.

When dispensing of purified water is desired, a movable valve handle 58 on the faucet valve assembly 16 is shifted as indicated by arrow 60 in FIG. 1. This valve handle movement opens a purified water discharge flow path through the faucet valve assembly 16 to couple the discharge spout 20 through a conduit 62 to the reverse osmosis unit 12. In addition, this valve handle movement operates internal valve members (not shown) within the faucet valve assembly 16 for coupling the reject water from the reverse osmosis unit 12 through the conduit 54 for relatively high rate flow into the reject water chamber 50 in the storage vessel 14. The reject water flowing into the storage vessel 14 provides a sufficient driving force against the movable barrier 48 to displace produced purified water from the purified water chamber 36. This purified water is forced through the conduit 32 and further through a conduit 64 within the reverse osmosis unit 12 for further passage through a filter medium 66 and into the purified water dispensing conduit 62. The purified water passes from the dispensing conduit 62 through the faucet valve assembly 16 to discharge from the spout 20.

Upon termination of purified water dispensing at the spout 20, the system reverts to the normal mode as described previously wherein the purified water chamber 36 within the storage vessel 14 is refilled with produced purified water. In this mode, using the illustrative faucet valve assembly 16, reject water produced by the reverse osmosis unit 12 as well as water within the reject water chamber 50 are coupled by the faucet valve assembly 16 for discharge flow through the drain conduit 56.

Conveniently, for purposes of brevity, the structure and operation of the faucet valve assembly 16 has been described briefly herein, it being understood that various faucet valve assembly arrangements may be used in the system of the present invention. However, the illustrative faucet valve assembly 16 (FIG. 1) provides a preferred construction corresponding generally with that shown and described in the inventor's U.S. Pat. No. 4,585,554, and copending Ser. No. 848,360, filed Apr. 4, 1986, which are incorporated by reference herein. Moreover, it will be understood multiple faucet type valves may be used for purified water dispensing at multiple sites of use, although only one reject water drain arrangement is required.

The regulated control valve assembly 18, in the preferred form of the invention, is mounted on the storage vessel 14 in a convenient position for operative regulation of the maximum fluid pressure to which the reverse osmosis unit 12 and the storage vessel 14 can be exposed. That is, the control valve assembly 18 includes the throttle valve 24 to halt or throttle the flow of incoming feed water to the system 10 when certain pressure conditions exist. Such throttling or halting of feed water inflow is effective to limit the maximum pressure of feed water supplied to the reverse osmosis unit to a predetermined threshold. In addition, throttling or halting of feed water inflow prevents further pressure rises in other portions of the purification system, particularly such as within the storage vessel 14.

Figure 2:
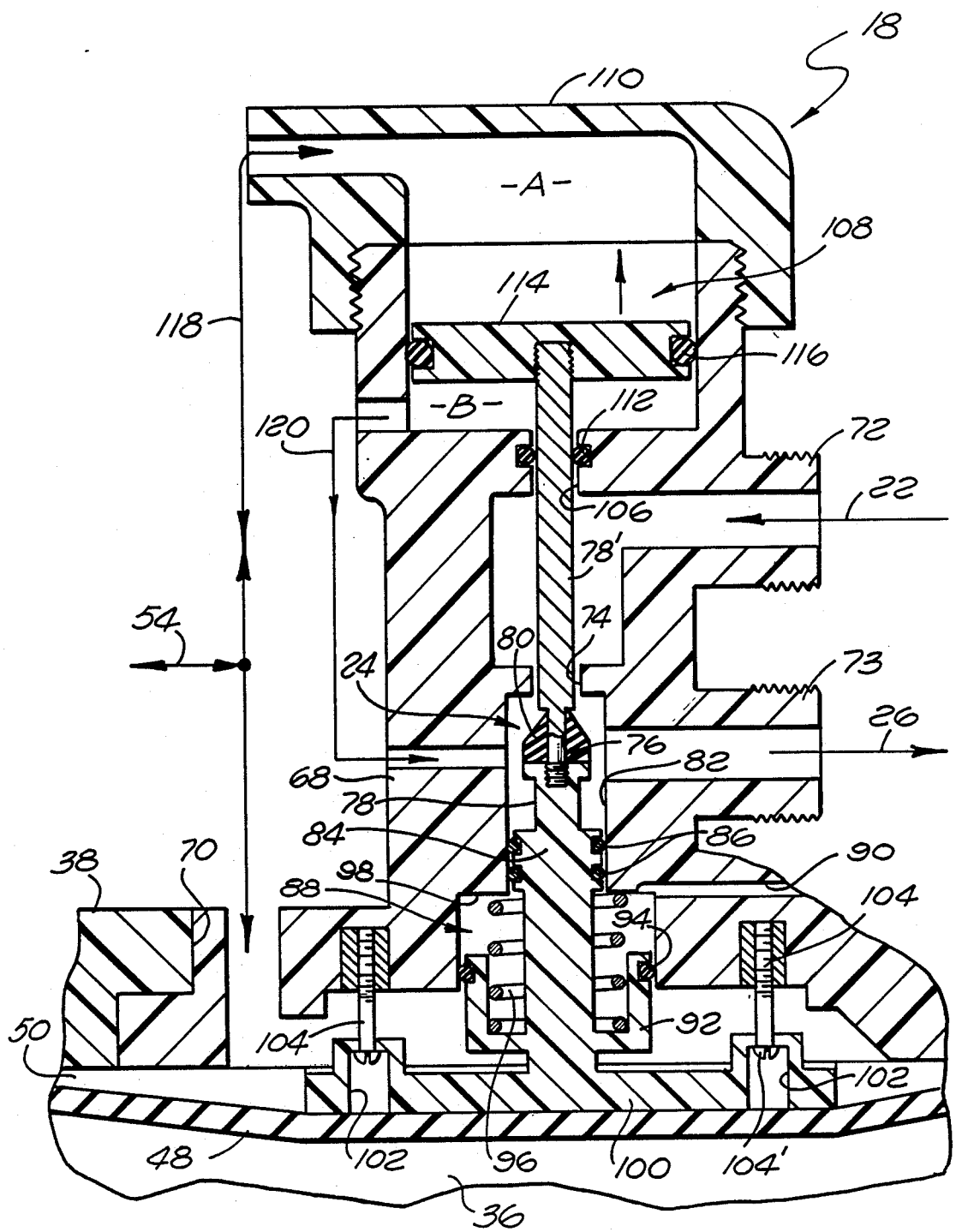
FIG. 2 is an enlarged fragmented and somewhat diagrammatic vertical sectional view depicting the regulated control assembly of FIG. 1.

More specifically, with reference to one preferred form of the control valve assembly 18 as viewed in FIG. 2, the control valve assembly comprises a valve body 68 mounted in any suitable manner onto the storage vessel 14 to bridge or close an opening 70 leading into the reject water chamber 50. A fitting 72 on the valve body 68 is adapted for connection to the feed water supply conduit 22 for guiding feed water inflow into the valve body interior for regulated flow past a valve seat 74 prior to feed water discharge through a fitting 73 coupled to the feed conduit 26 leading to the reverse osmosis unit 12. The throttle valve 24 includes a resilient valve head 76 carried on an elongated stem 78, with the valve head having a truncated conical valve face 80 for movement into seated or throttling relation with the valve seat 74.

The valve stem 78 projects from the valve head through a lower bore 82 in the valve body 68 in a direction toward the reject water chamber 50. An enlarged land or spool 84 is formed on the stem 78 within the bore 82, and this spool 84 carries one or more seal rings 86 to prevent water passage into a lower valve chamber 88 which is vented to atmosphere via a small vent port 90. This lower valve chamber 88 is diametrically enlarged relative to the bore 82 to receive a control piston 92 formed on the stem at a position spaced axially below the spool 84. The lower face of this control piston 92 is exposed to the underlying reject water chamber 50, and at least one seal ring 94 is carried about the control piston in sliding relation with the cylindrical wall of the chamber 88. A compression spring 96 reacts between the upper face of the control piston 92 and a shoulder 98 of the valve body 68 to urge the valve stem 78 and throttle valve head 76 thereon in a direction opening the valve seat 74 to permit water flow therethrough. An enlarged pressure plate 100 on the lowermost end of the valve stem 78 has guide holes 102 formed therein for passage of limit screws 104 fastened into the valve body 68, such that the pressure plate 100 engages the heads 104' of the limit screws when the valve stem 78 is displaced to a predetermined lower end limit position with the valve head 76 retracted from the valve head 74.

During normal operation of the water purification system, the fluid pressure within the reject water chamber 50 of the storage vessel 14 is applied to the lowermost face of the control piston 92. When the pressure force applied to the lower surface area of this control piston overcomes the opposing force of the spring 96 and the effects of the feed water pressure acting against the valve head 76, the entire valve stem 78 is shifted upwardly to move the valve head 76 into throttling or flow halting relation with the valve seat 74. Accordingly, when the storage vessel pressure rises to a predetermined threshold pressure, as selected by the design of the components, the valve head 76 is moved to halt or throttle further inflow of feed water to the system. This control mode is particularly applicable, for example, when continued purified water dispensing is attempted after the purified water chamber 36 reaches an empty condition yet reject water flow into the vessel 14 would otherwise continue but for throttling of the feed water inflow. During this control mode, the barrier 48 is spaced from the pressure plate 100 and the plate 100 is exposed substantially on both sides to reject chamber pressure, such that the pressure plate does not significantly impact control mode operation.

In another regulatory mode, when the purified water chamber 36 is refilled with purified water after dispensing is concluded, the control valve assembly 18 prevents overpressure within the storage vessel. More particularly, refilling of the water chamber 36 after a dispensing cycle causes the movable barrier 48 to move into contact with the pressure plate 100 as the reject water chamber 50 diminishes in size. When the purified water chamber 36 reaches the refilled condition, the barrier 48 is forced by the fluid pressure in the chamber 36 against the relatively large surface area of the pressure plate 100 to mechanically shift the valve stem 78 in a direction moving the valve head 76 to throttle or halt further feed water inflow. As a result, further production of purified water is substantially halted to prevent undesirable pressure rise in the storage vessel.

In accordance with a primary aspect of the invention, the regulated control valve assembly 18 further includes a pressure regulator which operates in conjunction with the above-described pressure limiting components to prevent the water pressure in the feed conduit 26 leading to the reverse osmosis unit 12 from exceeding a predetermined threshold. In this regard, with reference to FIG. 2, the elongated valve stem 78 includes an upper extension 78' which projects from the valve head 76 with clearance through the valve seat 74. This stem extension 78' extends further through a small upper bore 106 in the valve body 68 into an upper regulating chamber 108 defined cooperatively by an upper end of the valve body 68 and a cap 110 mounted thereon by thread-on attachment or the like. A seal ring 112 lines the small bore 106 and engages the stem extension 78' to isolate the regulating chamber 108 from the underlying interior of the valve body which communicates directly with the feed water supply conduit 22.

The uppermost end of the valve stem extension 78' carries a regulating piston 114 within the regulating chamber 108. This piston 114 has an outer seal ring 116 contacting the inner wall surface of the chamber 108 such that the piston 114 divides the regulating chamber into isolated upper and lower cavities respectively identified in FIG. 2 by the letters A and B. The upper cavity A is coupled to the reject water chamber 50 within the storage vessel 14 via a short branch conduit 118 which thereby communicates actual vessel pressure to the upper cavity. The lower cavity B is coupled by another short branch conduit 120 to the valve body interior at a position spaced at least slightly downstream from the valve seat 74, whereby the lower cavity B is subjected to the actual pressure of the feed water supplied through the feed conduit 26 to the reverse osmosis unit 12.

The regulating piston 114 responds to the pressure differential applied to the opposite faces thereof to apply a net force to the valve stem for opening or closing the valve seat 74. Importantly, the net force attributable to the regulating piston sums with other forces applied to the valve stem 78 by the other control components, as previously described, to prevent the pressure in the feed conduit 26 from exceeding a predetermined threshold. That is, when the pressure of the feed water in the feed water supply conduit 22 exceeds the predetermined threshold, the pressure of the feed water in the feed water conduit 26 downstream from the valve seat 74 will normally increase as a function of the feed water supply pressure. However, as the pressure in the feed conduit 26 increases to the selected threshold, the net upward forces acting upon the valve stem including predominantly the feed conduit pressure acting upon the regulating piston 114 becomes sufficient to overcome the net downward forces to move the valve head 76 toward a position throttling feed water inflow, and thereby toward a position to reduce the feed conduit pressure in a regulated manner. During this feed water pressure regulating mode, the lower control piston 92 applies an upward force to the valve stem which substantially offsets the downward-acting pressure forces applied to the upper face of the regulating piston 114. In this manner, feed water pressure regulation is obtained substantially independent of pressure fluctuations in the storage vessel 14.

The improved pressure regulated control valve assembly thus provides multiple control mode functions to limit storage vessel pressure and also to limit the pressure of feed water supplied to the system. All system components are thus safeguarded against exposure to undesirable high pressures, resulting in the ability to use lightweight, economical system components. The reverse osmosis unit 12 is also protected against high pressure inflows which can have a deleterious effect on the operating life thereof. Moreover, all control functions are incorporated into a single control valve assembly having a single valve head to throttle or halt or otherwise regulate feed water inflow.

A variety of modifications and improvements to the improved purification system and related control valve assembly will be apparent to those skilled in the art. Accordingly, no limitation on the invention is intended by way of the description herein or the accompanying, except as set forth in the appended claims.

What is claimed is:

1. A water purification system for producing relatively purified water from a supply of feed water under pressure, said system comprising:
   a reverse osmosis unit for receiving and processing a feed water supply to produce a purified water supply and a reject water supply;
   a feed water conduit for coupling a feed water supply for flow to said reverse osmosis unit;
   means for regulating the pressure of the feed water coupled for flow to said reverse osmosis unit to prevent the feed water pressure from exceeding a predetermined threshold pressure;
   a storage vessel having an internal volume and a movable barrier separating said internal volume into a purified water chamber and a reject water chamber;
   means for coupling said purified water supply for flow from said reverse osmosis unit into said purified water chamber;
   a faucet valve assembly having a discharge spout and including faucet valve means operable in a first position to communicate said purified water chamber to said spout for discharge and use of the purified water supply within said purified water chamber, and for communicating said reject water supply from said reverse osmosis unit into said reject water chamber at a substantial flow rate, whereby the reject water supplied into said reject water chamber expands said reject water chamber to displace said barrier in a manner forcing the purified water supply within said purified water chamber to flow out of said purified water chamber for discharge through said spout;
   said faucet valve means being further operable in a second position to prevent communication between said purified water chamber and said spout, and for coupling the reject water supply produced by said reverse osmosis unit and the reject water supply within said reject water chamber to a drain; and
   means for controlling the pressure within said storage vessel to prevent the storage vessel pressure from exceeding a predetermined pressure limit, wherein said regulating means and said controlling means include means for operatively positioning a common throttle valve to selectively throttle flow of feed water through said feed water conduit to said reverse osmosis unit, and wherein said throttle valve comprises a valve body defining a valve seat, means for coupling the feed water supply for flow through said valve seat into said feed water conduit, and a valve head movably positioned to selectively throttle feed water flow through said valve seat, said means for operatively positioning said throttle valve comprising a valve stem coupled to said valve head, said regulating means comprising a pressure regulator coupled to said valve stem and including means responsive to the pressure of the feed water within said feed water conduit downstream of said valve seat to movably position said valve head, and said controlling means comprising a pressure control member coupled to said valve stem and responsive to the fluid pressure within the storage vessel to movably position said valve head.

2. The water purification system of claim 1 wherein said controlling means includes means for substantially throttling the flow of feed water through said feed water conduit to said reverse osmosis unit when one of said purified and reject water chambers reaches a substantially filled condition with the other one of said purified and reject water chambers in a substantially empty condition.

3. The water purification system of claim 2 wherein said controlling means includes means for substantially throttling the flow of feed water through said feed water conduit to said reverse osmosis unit when said purified water chamber reaches a substantially filled condition.

4. The water purification system of claim 2 wherein said controlling means includes means for substantially throttling the flow of feed water through said feed water conduit to said reverse osmosis unit when said reject water chamber reaches a substantially filled condition.

5. The water purification system of claim 1 wherein said pressure regulator comprises a regulating piston having one face subjected to the pressure of the feed water within said feed water conduit, said regulating piston being carried by said valve stem to displace said valve head toward a position substantially throttling feed water flow through said valve seat when the pressure of the feed water within said feed water conduit reaches said predetermined threshold.

6. The water purification system of claim 1 wherein said pressure control member comprises a control piston having one face subjected to the fluid pressure within the storage vessel, said control piston being carried by said valve stem for displacing said valve head toward a position throttling feed water flow through said valve seat when the storage vessel pressure reaches said predetermined pressure limit, said pressure control member further including a pressure plate carried by said valve stem in a position within said storage vessel for contact by said barrier when said purified water chamber reaches a substantially filled condition to move said valve stem and said valve head thereon in a direction to substantially throttle feed water flow through said valve seat.

7. The water purification system of claim 5 wherein said pressure control member comprises a control piston having one face subjected to the fluid pressure within the storage vessel, said control piston being carried by said valve stem for displacing said valve head toward a position throttling feed water flow through said valve seat when the storage vessel pressure reaches said predetermined pressure limit, said pressure control member further including a pressure plate carried by said valve stem in a position within said storage vessel for contact by said barrier when said purified water chamber reaches a substantially filled condition to move said valve stem and said valve head thereon in a direction to substantially throttle feed water flow through said valve seat.

8. The water purification system of claim 7 wherein said valve body is mounted on said storage vessel.

9. A water purification system for producing relatively purified water from a supply of feed water under pressure, said system comprising:
   a reverse osmosis unit for receiving and processing a feed water supply to produce a purified water supply and a reject water supply;
   means for coupling a feed water supply for flow to said reverse osmosis unit;
   means for regulating the pressure of the feed water coupled for flow to said reverse osmosis unit to prevent the feed water pressure from exceeding a predetermined threshold pressure;
   a storage vessel having an internal volume defining a purified water chamber;
   means for coupling said purified water supply produced by said reverse osmosis unit for flow from said reverse osmosis unit into said purified water chamber;
   means for coupling said reject water supply produced by said reverse osmosis unit for flow to a drain;
   faucet valve means for dispensing purified water from said purified water chamber; and
   means for controlling the pressure within said storage vessel to prevent the storage vessel pressure from exceeding a predetermined pressure limit, wherein said feed water coupling means comprises a feed water conduit, and wherein said regulating means and controlling means include means for operatively positioning a common throttle valve to selectively throttle flow of feed water through said feed water conduit to said reverse osmosis unit, and wherein said throttle valve comprises a valve body defining a valve seat, means for coupling the feed water supply for flow through said valve seat into said feed water conduit, and a valve head movably positioned to selectively throttle feed water flow through said valve seat, said means for operatively positioning said throttle valve comprising a valve stem coupled to said valve head, said regulating means comprising a pressure regulator coupled to said valve stem and including means responsive to the pressure of the feed water within said feed water conduit downstream of said valve seat to movably position said valve head, and said controlling means comprising a pressure control member coupled to said valve stem and responsive to the fluid pressure within the storage vessel to movably position said valve head.

10. The water purification system of claim 9 wherein said controlling means includes means for substantially throttling the flow of feed water through said feed water conduit to said reverse osmosis unit when said purified water chamber reaches a substantially filled condition.

11. The water purification system of claim 9 wherein said controlling means includes means for substantially throttling the flow of feed water through said feed water conduit to said reverse osmosis unit when said reject water chamber reaches a substantially filled condition.

12. The water purification system of claim 9 wherein said pressure regulator comprises a regulating piston having one face subjected to the pressure of the feed water within said feed water conduit, said regulating piston being carried by said valve stem to displace said valve head toward a position substantially throttling feed water flow through said valve seat when the pressure of the feed water within said feed water conduit reaches said predetermined threshold.

13. The water purification system of claim 12 wherein said pressure control member comprises a control piston having one face subjected to the fluid pressure within the storage vessel, said control piston being carried by said valve stem for displacing said valve head toward a position throttling feed water flow through said valve seat when the storage vessel pressure reaches said predetermined pressure limit.

14. The water purification system of claim 9 wherein said valve body is mounted on said storage vessel.

15. A regulated control valve assembly in combination with a water purification system having a reverse osmosis unit for receiving and processing a supply of feed water to produce a purified water supply and a reject water supply, and a storage vessel connected for receiving the purified water supply from the reverse osmosis unit and for storing the purified water supply ready for use, and faucet valve means connected for dispensing purified water from the stored purified water supply said control valve assembly comprising:
   a valve body mounted on said storage vessel, said valve body including an inlet for connection to the supply of feed water, an outlet for connection to the reverse osmosis unit, and passage means extending between said inlet and outlet for flow of feed water therebetween, said passage means defining a valve seat;
   a throttle valve including a valve stem having a valve head thereon in operative association with said valve seat for controlling water flow therethrough;
   a pressure regulator coupled to said valve stem and including means responsive to the pressure of feed water downstream of said valve seat for moving said valve stem in a manner positioning said valve head to prevent the feed water pressure doownstream of said valve seat from exceeding a predetermined threshold; and
   control means coupled to said valve stem and including means responsive to the fluid pressure within said storage vessel for moving said valve stem in a manner positioning said valve head to prevent the storage vessel from exceeding a predetermined pressure limit.

16. The regulated control valve assembly of claim 15 wherein the storage vessel has a barrier dividing the interior of said vessel into first and second chambers, said first chamber constituting a purified water chamber, and wherein said control means comprises a control piston having one face subjected to the fluid pressure within the storage vessel, said control piston being carried by said valve stem for displacing said valve head toward a position throttling feed water flow through said valve seat when the storage vessel pressure reaches said predetermined pressure limit, said pressure control member further including a pressure plate carried by said valve stem in a position within said storage vessel for contact by said barrier when said purified water chamber reaches a substantially filled condition to move said valve stem and said valve head thereon in a direction to substantially throttle feed water flow through said valve seat.

* * * * *